US011201849B2

(12) United States Patent
Skinner et al.

(10) Patent No.: US 11,201,849 B2
(45) Date of Patent: Dec. 14, 2021

(54) NATURAL LANGUAGE CONNECTIVITY

(71) Applicant: Lenovo (Singapore) Pte. Ltd., Singapore (SG)

(72) Inventors: Jeffrey Earle Skinner, Raleigh, NC (US); Aaron Michael Stewart, Raleigh, NC (US); Jonathan Jen-Wei Yu, Raleigh, NC (US); Lincoln Penn Hancock, Raleigh, NC (US); Song Wang, Cary, NC (US); Ming Qian, Cary, NC (US); John Weldon Nicholson, Cary, NC (US); David Alexander Schwarz, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/871,963

(22) Filed: Jan. 15, 2018

(65) Prior Publication Data
US 2019/0222555 A1 Jul. 18, 2019

(51) Int. Cl.
*H04L 29/12* (2006.01)
*G10L 15/18* (2013.01)
*G10L 15/22* (2006.01)
*H04L 12/24* (2006.01)
*H04W 48/10* (2009.01)

(52) U.S. Cl.
CPC ...... *H04L 61/1594* (2013.01); *G10L 15/1822* (2013.01); *G10L 15/22* (2013.01); *H04L 41/14* (2013.01); *H04L 41/22* (2013.01); *H04L 61/3015* (2013.01); *H04W 48/10* (2013.01); *G10L 2015/223* (2013.01); *H04L 61/103* (2013.01)

(58) Field of Classification Search
CPC ............... G10L 15/22; G10L 15/1822; G10L 2015/223; H04L 61/1594; H04L 41/14; H04L 41/42; H04L 61/3015; H04W 48/10
See application file for complete search history.

(56) References Cited

U.S. PATENT DOCUMENTS 6,584,439 B1 *  6/2003  Geilhufe ................. G06F 3/167
                                                       704/270
10,089,981 B1 * 10/2018  Elangovan ............ H04M 1/271
10,127,906 B1 * 11/2018  Mutagi .................... G10L 15/22
(Continued)

OTHER PUBLICATIONS

User Guide. Verizon, MOTO Z | DROID, Oct. 2016 (66 pages).
(Continued)

*Primary Examiner* — Andrew C Georgandellis
(74) *Attorney, Agent, or Firm* — Brian J. Pangrle

(57) ABSTRACT

A device can include a processor; memory accessible to the processor; a microphone operatively coupled to the processor; a network interface operatively coupled to the processor; circuitry that parses audio signals received via the microphone for a name and a type of device; circuitry that analyzes network information associated with remote devices accessible via the network interface based at least in part on at least one of the name and the type of device to associate the name and the type of device with one of the remote devices; and circuitry that stores the name and the type of device to the memory in association with the one of the remote devices.

14 Claims, 12 Drawing Sheets

(56) References Cited

U.S. PATENT DOCUMENTS

| | | | |
|---|---|---|---|
| 2005/0157689 A1* | 7/2005 | Schnurr | H04L 51/043 370/338 |
| 2014/0302790 A1* | 10/2014 | Yan | H04L 67/306 455/41.2 |
| 2015/0373747 A1* | 12/2015 | Pedroza | H04W 76/10 455/41.2 |
| 2017/0070478 A1* | 3/2017 | Park | H04L 67/12 |
| 2018/0122378 A1* | 5/2018 | Mixter | H04L 12/282 |
| 2018/0130052 A1* | 5/2018 | Eisen | G06Q 20/3821 |
| 2018/0367993 A1* | 12/2018 | Itaya | H04W 4/08 |

OTHER PUBLICATIONS

InSSIDer, Free WiFi Scanning Software for Windows, User Guide, MetaGeek, 2012 (15 pages).
Speech | Apple Developer Documentation, SDK, iOS 10.0+ (https://developer.apple.com/documentation/speech), accessed 2017, copyright 2017 (4 pages).
Application Report, Texas Instruments, AN-1811 Bluetooth Antenna Design, SNOA519B—Mar. 2008—Revised May 2013 (32 pages).
WIFI Antenna Design, Copyright antenna-theory.com, 2012-2014 (http://www.antenna-theory.com/design/wifi.php) (1 page).

* cited by examiner

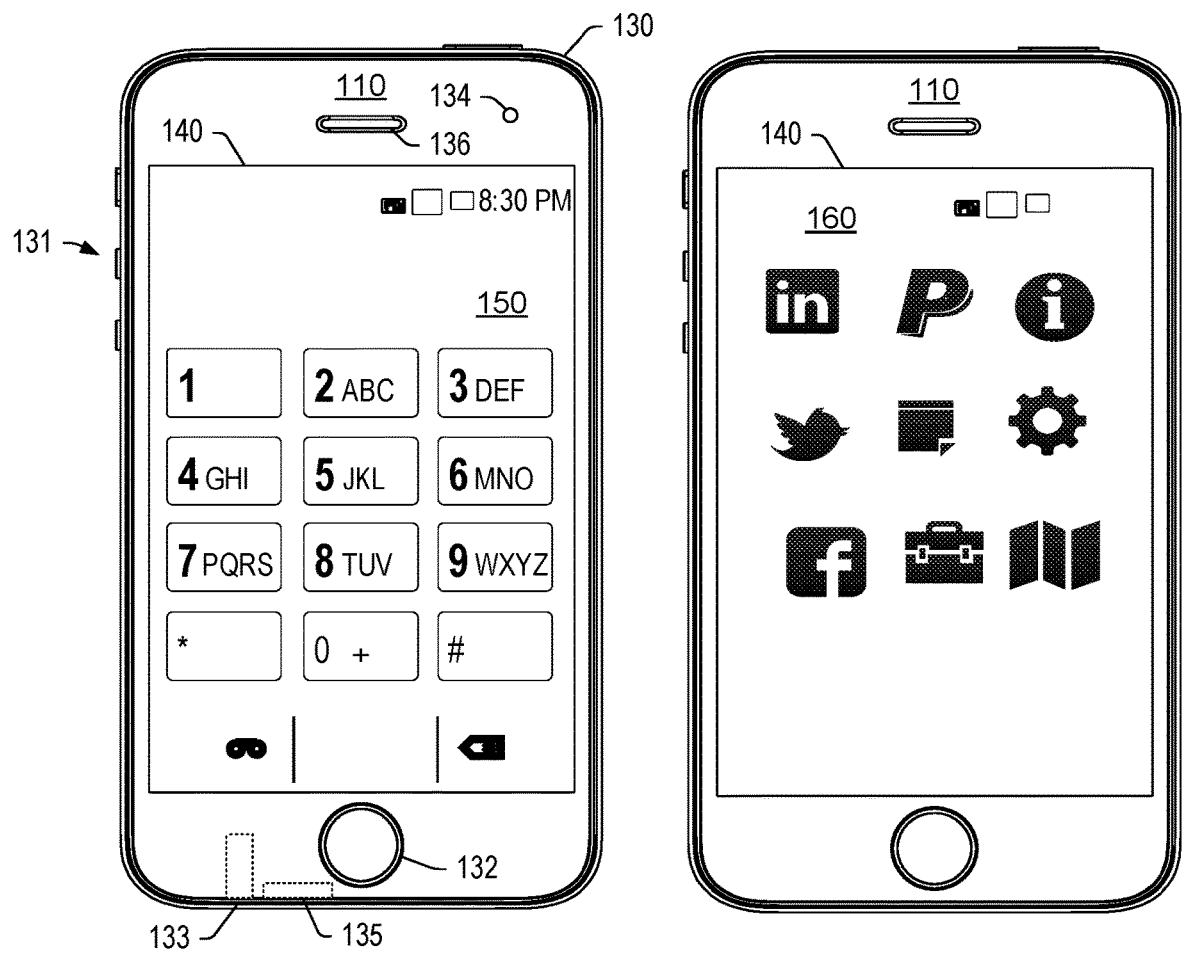
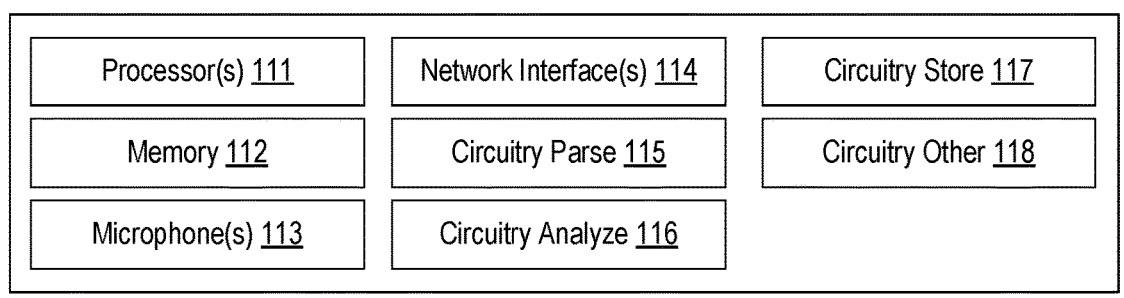
FIG. 1

Information 600

| Device List | | | | | | | |
|---|---|---|---|---|---|---|---|
| Interface | MAC Address | IP Address | Name | RSSI | Quality | TX/RX Rate | Lease |
| vlan2 | 00:01:5D:6A:51:48 [oui] [static] [bwlimit] | XX.YYY.72.1 | | | | | |
| br0 | 88:DF:B9:1A:B9:84 [oui] [static] [bwlimit] | 192.168.11.12 | Moto | | | | 17:43:47 |
| br0 | 35:D0:69:E0:A2:69 [oui] [static] [bwlimit] | 192.168.11.18 | IPhoneSMP | | | | 23:55:55 |
| eth2 | 76:D5:0A:59:BE:20 [oui] [static] [bwlimit] [wfilter] | 192.168.11.28 | SMP-PC | -46 dBm | 39 | 39 / 72 | 23:55:57 |
| eth2 | 59:F2:8E:2F:F2:46 [oui] [static] [bwlimit] [wfilter] | 192.168.11.33 | Susan-TP | -45 dBm | 40 | 20 / 24 | 23:55:53 |
| br0 | 00:15:5C:7C:06:4A [oui] [static] [bwlimit] | 192.168.11.34 | Dad | | | | 17:44:03 |
| eth2 | E8:D2:75:42:D0:B0 [oui] [static] [bwlimit] [wfilter] | 192.168.11.44 | HP4EXXYY | -46 dBm | 39 | 1 / 54 | 17:44:31 |

| Noise Floor (eth2) : | -85 dBm |
|---|---|

FIG. 6

| Device | MAC Address | Vendor | Signal Strength | Strength History | Class | Services |
|---|---|---|---|---|---|---|
| MyD | 00:1F:02:XXYY | Nokia Danmark A/S | -54 dBm | | Cell Phone | Networking, Object Transfer, Telephony |
| MyD | 5C:E2:F4:XXYY | AcSiP Tech Corp. | -61 dBm | | Cell Phone | Networking, Capturing, Object Transfer, Telephony |
| MyD | 88:1F:A1:XXYY | Apple | -59 dBm | | Portabale Audio | Networking, Capturing, Audio, Telephony |
| MyD | 00:17:F2:XXYY | Apple | -73 dBm | | Laptop | Networking, Capturing, Object Transfer, Audio |

Information 700

FIG. 7

Information 800

| Radio | SSIDS | Channel | Signal | SSID Count | PHY Type | Security | Min Rate | Max Rate |
|---|---|---|---|---|---|---|---|---|
| 2C:4E:A0:XXYYY | SMP-WiFi | 11 | -35 | 1 | b, g, n | Locked | 1 | 216.7 |
| 80:37:B1:XXYYY | My-Wi-Fi | 11 | -48 | 1 | g, n | Locked | 6 | 144.4 |
| 9C:37:73:XXYYY | CenturyLink72 | 6 | -60 | 1 | b, g, n | Locked | 1 | 216.7 |
| 5A:F5:C1:XXYYY | NETGEAR13 | 5 | -70 | 1 | b, g, n | Locked | 1 | 300 |
| E0:FF:3F:XXYYY | Guest-Rent | 2 | -71 | 2 | b, g, n | Un/Locked | 1 | 216.7 |
| E1:6A:C3:XXYYY | NETGEAR51 | 4 | -73 | 1 | b, g, n | Locked | 1 | 144.4 |
| 88:1E:C0:XXYYY | 1105Adams | 10 | -73 | 1 | b, g, n | Locked | 1 | 144.4 |
| 4A:B3:5E:XXYYY | MyCharter | 8 | -75 | 1 | b, g, n | Locked | 1 | 216.7 |
| 9C:3D:CF:XXYYY | ????? | 9 | -80 | 1 | b, g, n | Locked | 1 | 144.4 |

FIG. 8

Information 900

| | |
|---|---|
| String | ADDRESS |
| | The email address. |
| String | CONTENT_ITEM_TYPE |
| | MIME type used when storing this in data table. |
| String | CONTENT_TYPE |
| | The MIME type of CONTENT_URI providing a directory of email addresses. |
| String | DISPLAY_NAME |
| | The display name for the email address |
| | Type: TEXT |
| String | EXTRA_ADDRESS_BOOK_INDEX |
| | Add this query parameter to a URI to get back row counts grouped by the address book index as cursor extras. |
| String | EXTRA_ADDRESS_BOOK_INDEX_COUNTS |
| | The array of group counts for the corresponding group. |
| String | EXTRA_ADDRESS_BOOK_INDEX_TITLES |
| | The array of address book index titles, which are returned in the same order as the data in the cursor. |
| int | TYPE_HOME |
| int | TYPE_MOBILE |
| int | TYPE_OTHER |
| int | TYPE_WORK |

FIG. 9

Information 1000

| | | |
|---|---|---|
| Contacts | | |
| long | _ID | Row ID. Consider using LOOKUP_KEY instead. |
| String | LOOKUP_KEY | An opaque value that contains hints on how to find the contact if its row id changed as a result of a sync or aggregation. |
| long | NAME_RAW_CONTACT_ID | The ID of the raw contact that contributes the display name to the aggregate contact. During aggregation one of the constituent raw contacts is chosen using a heuristic: a longer name or a name with more diacritic marks or more upper case characters is chosen. |
| String | DISPLAY_NAME_PRIMARY | The display name for contact. Display name contributed by the raw contact referred to by the NAME_RAW_CONTACT_ID column. |
| long | PHOTO_ID | Reference to the row in the ContactsContract.Data table holding the photo. That row has the mime type CONTENT_ITEM_TYPE. The value of this field is computed automatically based on the IS_SUPER_PRIMARY field of the data rows of that mime type. |
| long | PHOTO_URI | A URI that can be used to retrieve the contact's full-size photo. This column is the preferred method of retrieving the contact photo. |
| long | PHOTO_THUMBNAIL_URI | A URI that can be used to retrieve the thumbnail of contact's photo. This column is the preferred method of retrieving the contact photo. |
| int | IN_VISIBLE_GROUP | An indicator of whether this contact is supposed to be visible in the UI. "1" if the contact has at least one raw contact that belongs to a visible group; "0" otherwise. |
| int | HAS_PHONE_NUMBER | An indicator of whether this contact has at least one phone number. "1" if there is at least one phone number, "0" otherwise. |
| int | TIMES_CONTACTED | The number of times the contact has been contacted. See markAsContacted(ContentResolver, long). |
| long | LAST_TIME_CONTACTED | The timestamp of the last time the contact was contacted. See markAsContacted(ContentResolver, long). Setting this field also automatically increments TIMES_CONTACTED. |
| int | STARRED | An indicator for favorite contacts: '1' if favorite, '0' otherwise. When raw contacts are aggregated, this field is automatically computed: if any constituent raw contacts are starred, then this field is set to '1'. |
| String | CUSTOM_RINGTONE | A custom ringtone associated with contact. Typically is URI returned by an activity launched with the ACTION_RINGTONE_PICKER intent. |
| int | SEND_TO_VOICEMAIL | An indicator of whether calls from this contact should be forwarded directly to voice mail ('1') or not ('0'). When raw contacts are aggregated, this field is automatically computed: if all constituent raw contacts have SEND_TO_VOICEMAIL=1, then this field is set to '1'. |
| int | CONTACT_PRESENCE | Contact IM presence status. See ContactsContract.StatusUpdates for individual status definitions. Automatically computed as the highest presence of all constituent raw contacts. |
| String | CONTACT_STATUS | Contact's latest status update. Automatically computed as the latest of all constituent raw contacts' status updates. |
| long | CONTACT_STATUS_TIMESTAMP | The absolute time in milliseconds when the latest status was inserted/updated. |
| String | CONTACT_STATUS_RES_PACKAGE | The package containing resources for this status: label and icon. |
| long | CONTACT_STATUS_LABEL | The resource ID of the label describing the source of contact status, e.g. "Google Talk". This resource is scoped by the CONTACT_STATUS_RES_PACKAGE. |
| long | CONTACT_STATUS_ICON | The resource ID of the icon for the source of contact status. This resource is scoped by the CONTACT_STATUS_RES_PACKAGE. |

FIG. 10

NATURAL LANGUAGE CONNECTIVITY

TECHNICAL FIELD

Subject matter disclosed herein generally relates to technology for computing or other devices.

BACKGROUND

Various computing devices include circuitry that can operatively couple to one or more networks.

SUMMARY

A device can include a processor; memory accessible to the processor; a microphone operatively coupled to the processor; a network interface operatively coupled to the processor; circuitry that parses audio signals received via the microphone for a name and a type of device; circuitry that analyzes network information associated with remote devices accessible via the network interface based at least in part on at least one of the name and the type of device to associate the name and the type of device with one of the remote devices; and circuitry that stores the name and the type of device to the memory in association with the one of the remote devices. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 1 is a diagram of an example of a device in various example modes and examples of features of such a device;

FIG. 6 is a diagram of example information in tabular form;

FIG. 7 is a diagram of example information in tabular form;

FIG. 8 is a diagram of example information in tabular form;

FIG. 9 is a diagram of example information in tabular form;

FIG. 10 is a diagram of example information in tabular form;

DETAILED DESCRIPTION

Figure 2:
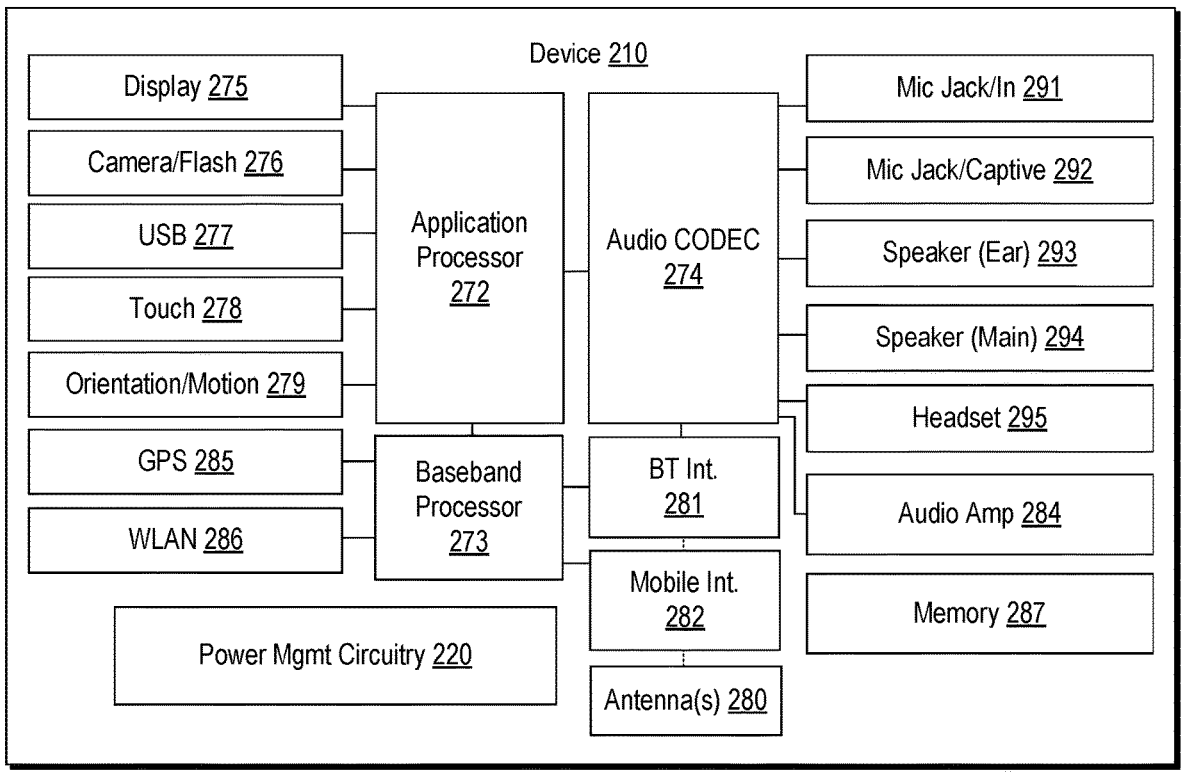
FIG. 2 is a diagram of an example of a device.

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, a method can include identifying and "naming" new or unknown devices on a network to allow for device-to-device connections through natural language commands. In such an example, the method can include storing a named device to memory of the device where such information may be stored in association with other information. For example, consider storing a named device, as may be uttered by a user, in association with a contact entry in a contact database of a device, which can include information such as an individual's name, an email address, a phone number, etc.

As an example, a device can include circuitry that provides for voice control of the device, which may optionally be utilized for making one or more device-to-device connections through natural language and, for example, through no or minimal graphical user interface (GUI) interaction. In such an example, the device may include a speech recognition (SR) engine and/or a natural language processing (NLP) engine.

As an example, a method can include performing voice controlled connectivity optionally without knowing a device's formal name (e.g., a name seen by a network). For example, such a method can include receiving and parsing various sources of information in an effort to associate what may be a likely "friendly" name to a device (e.g., "Joe's Moto", etc.) such that one or more connections can be made using natural language (e.g., "Send file X to Joe's Moto"). In such an example, a friendly name (e.g., "Joe's Moto", etc.) may be stored to memory of a user's device (e.g., in association with a contacts database, etc.) to facilitate subsequent interaction with the device assigned the friendly name. Such a friendly name can include a possessive form of a name, nickname, familial relationship name, a title, etc. along with a type of device (e.g., "Joe's Moto", "Goofy's iPhone", "Mom's ThinkPad", "Doctor's Blackberry", etc.).

As an example, consider a scenario where Carla and Sam are having a work meeting. Carla is viewing a web article on her phone that she wants to quickly cast to Sam's tablet so they can view it at a larger size. Carla says, "Show this on Sam's tablet". In such an example, circuitry of Carla's phone (e.g., voice assistant circuitry) may respond by rendering a message (e.g., graphically and/or audibly) with "Sam's tablet not found." In such a scenario, Sam's tablet has the name "SThomas057983", such that it is not found via the information "Sam's tablet" (e.g., audio information as processed at least in part by circuitry of Carla's phone). As another example, consider a scenario where Sam's tablet has the formal name "Sam's iPad", in such an example, Carla may not be able to connect to it by referring to it as "Sam's tablet", which may be considered to be a friendly name that Carla would like to use to identify a tablet utilized by Sam.

As an example, various types of devices that include one or more network interfaces (e.g., for operatively coupling to one or more wireless networks, etc.) can provide for automatic, semi-automatic or manual generation of a so-called "friendly" name, which may optionally be changed by a user. As an example, various types of device can issue a prompt for a user to enter a name. Such friendly names may make devices easier to identify on a network for their users as they may know a device's friendly name.

As an example, a method can include assigning a friendly name to a remote device where the friendly name is stored locally on a device that is not the remote device and where, for example, the friendly name that is stored locally is different than the friendly name of the remote device (e.g., as stored on the remote device). For example, consider assigning "Joe's Moto" to a remote device. In such an approach, an individual may refer to the remote device as "Joe's Moto" for purposes of executing one or more actions (e.g., cast, send, etc.). Such an approach can allow a user to automatically have an uttered friendly name be properly associated with a device that is identifiable via a network based at least in part on network information and optionally one or more other types of information. A user's device may include friendly name assignment circuitry that processes audio uttered by the user for a friendly name that can be assigned to a device identifiable via a network. In such an example, the friendly name can include an individual's name and a noun that can be a type of device utilized by that individual (e.g., "Joe's Moto"). In such an example, the individual's name may be identified as being in a possessive form and the friendly name may be stored in such a manner (e.g., where the name is "Joe", the possessive form can be "Joe's", which may be stored as "Joe's" as in the example of "Joe's Moto").

As an example, a method can include pinpointing an unknown device by giving it a friendly name that is capable of being understood via natural language processing (NLP). Such an approach may be more expeditious and user friendly compared to scrolling through a GUI that shows a listing of devices on a network where, for example, the name of an intended device (e.g., target device) may not be identifiable and an individual may erroneously connect to several devices before finding to the proper target device.

As to a natural language approach, referring again to the Carla and Sam example above, if they have the only two devices on the network, Carla may see "SThomas057983" in a GUI and assume that it must be Sam's tablet. While such a simplified scenario may provide for accuracy as to connecting, in a natural language approach, it would have been easier for her to skip the GUI altogether and make the connection by saying "Cast to Sam's tablet" (e.g., being able to utter a command and a target as a short audio statement). A natural language approach can be more expeditious than Carla relying on voice input to cast her device to Sam's tablet, where she would likely need to refer to it as "SThomas057983" where a misreading of a number, etc., may lead to one or more errors. Uttering the moniker "SThomas057983" can involve uttering "S" then "Thomas" then "0", then "5", then "7", then "9", then "8", and then "3", which may take approximately 5 seconds or longer to assure that speech processing circuitry can accurately convert from speech to text. In contrast, uttering "Sam's tablet" may take approximate 1 second. As an example, speech processing circuitry (e.g., a SR engine, a NLP engine, etc.) may be trained specifically for possessive forms to enhance recognition of such forms where a logical relationship is predetermined to exist between a name in possessive form and a noun that follows, as in the English language. In the foregoing example, Carla is able to use a friendly name that can be at her discretion where the friendly name includes some amount of information that can be utilized for purposes of making a proper association (e.g., where the friendly name includes some information that can be linked to a contact, a device identifiable via a network, etc.); whereas, for "SThomas057983", it is a moniker (e.g., identifier) that is likely to be not under Carla's control.

As an example, a natural language approach to associating friendly names to remote devices can help to address one or more problems that might surface or have potential to surface using natural language to connect devices (e.g., wasted time, frustration, loss of focus, etc.).

As an example, a scenario can involve assumptions of a new and unnamed device. For example, assuming a friendly device name is established for all but a new device, assume that a voice utterance referring to a new device (e.g., "Sam's tablet") is referring to the device with an unestablished friendly name. In such an example, any formal device name of this unestablished device (e.g., "SThomas057983") may then be automatically matched to the friendly name derived from the voice utterance. Optionally, a method may involve sending a prompt to the new device allowing the user to confirm they are or are not "Sam's tablet."

As to a scenario that can involve stronger, smarter name association, consider a method that, to identify "SThomas057983" as "Sam's tablet," information such as network information is accessed (e.g., one or more streams of information, etc.). For example, through access to Carla's calendar, it may provide information as to a meeting that she is attending with Sam Thomas making "SThomas057983" appear to be a likely match. For additional confirmation, as an example, a method may look at the signal strength and/or one or more other types of information broadcasted by the device "SThomas057983" to determine that it is nearby and/or a tablet computer. As an example, a method might include looking for one or more other "Sam" devices to see if they are near the unknown device.

As an example, a method may include looking for one or more references to one or more specific device types in either an established name (e.g., "Jon_iPhone2000") and/or one or more voice utterances provided in context (e.g., "Send to Jon's phone"). In such an example, "iPhone" may be generally matched to "phone" as a device type match. As an example, accuracy may be improved further by employing one or more language model tools to match words by meaning (e.g., in addition to character makeup/order, etc.). For example, if someone said "send to John's handheld", a method can include parsing the information as to "handheld" to know that "handheld" likely refers to a phone and might look for that type of device.

As an example, a method can include leverages existing data where such data may include, for example, device information (e.g., one or more of name, WiFi strength, proximity to other devices, and any other information about the device, etc.), contextual data (e.g., one or more of time, location, calendar entries, contacts, etc.) to pinpoint and associate an unknown device to its owner or current user, streamlining a connection process.

As an example, a method can include utilizing a data set that is sharable across devices that provides a table of known formal device names and established friendly names associated to each respective formal device name. As context and voice utterances expand this data set, the new data may be recorded and updated to be stored on one central device, a cloud service or a plurality of involved devices (e.g., that subscribe to a particular service, run a particular app, etc.).

As an example, one or more devices may be set (e.g., by a user, an application, etc.) to be "open to be connected" or "closed" which may be discoverability settings. As an example, an application executable on a target device may provide for security as to a connection, command, etc., from one or more other devices. For example, such an application may issue a notion that requires an action on behalf of the target device to confirm such an action and/or possibly to confirm a friendly name assignment (e.g., an association of a "friendly" name to the target device as uttered by another individual that is not the user and/or owner of the target device).

FIG. 1 shows an example of a device 110 that includes a housing 130, controls 131 and 132 (e.g., buttons, switches, etc.), one or more sockets 133 (e.g., power, audio, bus, etc.), a camera 134, a microphone 135, a speaker, and a touchscreen display 140 where the device 110 can render one or more graphical user interfaces (GUIs) such as examples GUIs 150 and 160 to the touchscreen display 140.

FIG. 1 also shows various blocks as to features of the device 110 such as, for example, one or more processors 111, memory 112 (e.g., memory circuitry, etc.), one or more microphones 113 (e.g., microphone circuitry, etc.), one or more network interfaces 114, circuitry that parses 115, circuitry that analyzes 116, circuitry that stores 117 and one or more other types of circuitry 118.

As an example, the device 110 can include a processor (see, e.g., the one or more processors 111); memory accessible to the processor (see, e.g., the memory 112); a microphone operatively coupled to the processor (see, e.g., the one or more microphones 113); a network interface operatively coupled to the processor (see, e.g., the one or more network interfaces 114); circuitry that parses audio signals received via the microphone for a name and a type of device (see, e.g., the circuitry that parses 115); circuitry that analyzes network information associated with remote devices accessible via the network interface based at least in part on at least one of the name and the type of device to associate the name and the type of device with one of the remote devices (see, e.g., the circuitry that analyzes 116); and circuitry that stores the name and the type of device to the memory in association with the one of the remote devices (see, e.g., the circuitry that stores 117).

As an example, circuitry that parses can include speech recognition circuitry. As an example, circuitry that analyzes can include logic circuitry that can compare various types of information. As an example, circuitry that stores can include circuitry that is operatively coupled to one or more memory components. As an example, other types of circuitry can include identifier circuitry that can access information such as network information as may be available through wireless signals. As an example, identifier circuitry can include a program that is executable via one or more processors that can access wireless signals and determine one or more types of information associated with each of the wireless signals (e.g., device information, rate information, security information, history, etc.).

In the example of FIG. 1, the GUI 150 is a phone GUI (e.g., of a phone mode) that includes a numeric keypad with graphical controls and the GUI 160 is an applications GUI (e.g., of an application mode) with graphical controls such as icons that can be utilized to instantiate (e.g., launch, transition to, etc.) one or more applications (e.g., apps, etc.).

As an example, an application may be local, remote or a combination of local and remote. For example, a settings application may provide for viewing, changing, etc., one or more settings of the device 110. A setting may be a circuitry setting such as a wireless network setting that instructs the device 110 to operatively coupled to (e.g., join) a wireless network, which may be a Wi-Fi network, a BLUETOOTH network, a cellular network, etc. As an example, the device 110 may automatically join a wireless network, for example, when powered on, transitioned from one power state to another, upon detection of a network, etc. As an example, the device 110 may pair with one or more other devices via a network such as a piconet (e.g., consider a BLUETOOTH network, etc.). As an example, a network may be local or local and remote (e.g., consider a network that is operatively coupled to the Internet, etc.).

Various types of networks may be specified by an entity or entities such as the IEEE (e.g., IEEE 802.11.X, 802.15.X, etc.).

IEEE.802.11.X includes specifications for Wi-Fi technology for wireless local area networking of devices. Some examples of devices that may utilize Wi-Fi technology include personal computers, video-game consoles, phones and tablets, digital cameras, smart TVs, digital audio players and modern printers. As an example, Wi-Fi technology may be utilized in an Internet of Things (IoT) where various devices can include wireless circuitry (e.g., one or more Wi-Fi adapters, etc.).

As an example, a Wi-Fi compatible device may connect to the Internet via a WLAN and a wireless access point. Such an access point (or hotspot) may have a range of about 20 meters (66 feet) indoors and a greater range outdoors (e.g., depending on environment, signals, obstructions, etc.). As an example, a hotspot coverage may be as small as a single room with walls that block radio waves, or as large as many square kilometers achieved by using multiple overlapping access points. As an example, a Wi-Fi network may include wireless router that can takes a wired or wireless Internet connection (e.g., via a modem) and transform it into a wireless signal. As an example, a wired Internet connection may be via a cable company and a wireless Internet connection may be via a cellular carrier (e.g., consider one or more of 4G, LTE, etc.).

Wi-Fi technology may utilize one or more electromagnetic frequency bands. For example, consider one or more of the 2.4 gigahertz (12 cm) UHF and 5.8 gigahertz (5 cm) SHF industrial, scientific and medical (ISM) bands. A Wi-Fi network may be accessible by a device that is within range of a wireless modem (e.g., wireless router, etc.).

IEEE 802.15.1 pertains to a working or task group or specification associated with WPAN and BLUETOOTH technology. The IEEE 802.15.1 defines physical layer (PHY) and Media Access Control (MAC) specifications for wireless connectivity with fixed, portable and moving devices within or entering personal operating space. Such connectivity may be part of a piconet, which may be defined as an ad hoc network that links a wireless user group of devices using BLUETOOTH technology protocols. A piconet can include of two or more devices occupying a common physical channel (e.g., synchronized to a common clock and hopping sequence). A piconet may allow one master device to interconnect with a number of active slave devices (e.g., from 1 to 7 active slave devices or possibly more). As an example, one or more slave devices may be inactive, or parked, where a master device may bring one or more of the slave devices into active status.

As an example, BLUETOOTH technology may operates at frequencies between approximately 2402 MHz and approximately 2480 MHz, or approximately 2400 MHz and approximately 2483.5 MHz including guard bands approximately 2 MHz wide at the bottom end and approximately 3.5 MHz wide at the top. Such frequencies are in the industrial, scientific and medical (ISM) 2.4 GHz short-range radio frequency band.

A wireless network may be protected by one or more security mechanisms. For example, one or more of a password, a code, etc., may be required to access, join, pair, etc., a wireless network. As an example, a wireless network may be detectable but require execution of a security mechanism prior to joining, pairing, etc.

As an example, the device 110 of FIG. 1 can include an operating system (OS) such as, for example, an iOS OS (Apple, Cupertino, Calif.), ANDROID OS (Google, Mountain View, Calif.), WINDOWS OS (Microsoft Corporation, Redmond, Wash.), FIRE OS (Amazon, Seattle, Wash.), etc. A document entitled "User Guide", Verizon, MOTO Z|DROID, October 2016 (66 pages), is incorporated by reference herein and describes a smart phone marketed as the MOTO Z DROID smart phone (Model XT1650-01, Motorola Mobility LLC, Chicago, Ill.).

FIG. 2 shows a block diagram of an example of a device 210. As an example, the device 110 of FIG. 1 may include one or more features of the device 210 of FIG. 2.

In FIG. 2, the device 210 includes an application processor 272, a baseband processor 273, an audio codec 274, a display 275 (e.g., including display driver circuitry), a camera/flash sub-system 276, a USB port 276, touch sensing circuitry 278, orientation/motion sensing circuitry 279, one or more antennas 280, BLUETOOTH circuitry 281, mobile circuitry 282, the power management circuitry 220, audio amplification circuitry 284, GPS circuitry 285, WLAN circuitry 286, memory 287, a microphone jack in 291, a captive microphone 292, a captive speaker 293, one or more additional speakers 294, and headset out/circuitry 295. Various types of interfaces may exist between circuitry of a device such as the device 210. As an example, consider an I$^2$S interface, which may, for example, operatively couple the application processor 272 and the audio codec 274; the baseband processor 273 and the audio codec 274; and the BLUETOOTH circuitry 281 and the audio codec 274.

As to the one or more antennas 280, consider, as an example, one or more types of antennas that can received and/or transmit electromagnetic energy (e.g., EM waves). As to BLUETOOTH antenna design, some aspects are described in an Application Report of Texas Instruments entitled AN-1811 Bluetooth Antenna Design (SNOA519B—March 2008—Revised May 2013). As to Wi-Fi antenna design, some aspects are described in an As an example, a Wi-Fi interface may operate a high frequency compared to other interfaces of a device. As an example, consider a half-wavelength at 2.4 GHz to be 6.25 cm (2.5 inch), and a half-wavelength at 5 GHz to be 3 cm or just over an inch. Hence, using quarter-wavelength antennas leveraging a device's groundplane can result in a relatively small antenna. As to quarter-wavelength antennas for Wi-Fi some examples include the inverted F antenna (IFA) and the planar inverted F antenna (PIFA). As an example, a Wi-Fi antenna may be utilized to simultaneously transmit and receive. Antenna gain may be specified in dB, such as peak antenna gain equals +2 dB (e.g., efficiency times the directivity is +2 dB).

As an example, a device such as the device 110 and/or the device 210 may include one or more of IEEE 802.11a/b/g/n/ac Wi-Fi, multiple-input and multiple-output (MIMO), BLUETOOTH 5.0, and NFC. MIMO can be utilized as a method for multiplying the capacity of an electromagnetic energy (e.g., EM wave) link using multiple transmit and receive antennas to exploit multipath propagation. As an example, MIMO can include one or more of precoding, spatial multiplexing (SM), and diversity coding.

As an example, a device can include one or more antennas, which may include one or more directional antennas where a signal received may be stronger when the device is oriented in a certain manner. As an example, a device can include circuitry that approximate a direction of a signal that is received where, for example, a compass, GPS, or other circuitry may be able to assign a coordinate-based direction to the signal (e.g., East, West, North, South, up, down, etc.). As an example, a device may include circuitry that can determine if a signal transmitter is moving, has moved, etc.

As an example, such information may be utilized in one or more methods. As an example, a device may issue a notification for a user to move his or her device (e.g., spin 360, etc.) to be able to determine a direction or directions of one or more signals, which may be considered to be network information.

As an example, the device 110 and/or the device 210 may receive audio input via a microphone where such audio input may be digitized, for example, via one or more analog-to-digital converters (ADCs). As an example, the device 110 and/or the device 210 may include circuitry that can process digitized audio input.

As an example, circuitry that can process digitized audio input may include speech recognition (e.g., voice recognition) circuitry such as a speech recognition engine (SR engine). As an example, an SR engine may provide for recognition and translation of spoken language into text (e.g., speech to text (STT)). A SR engine may require training where, for example, an individual speaker reads text or isolated vocabulary. In such an example, the SR engine may analyze the speaker's specific voice and use it to fine-tune the recognition of that individual's speech, resulting in increased accuracy. Some types of SR engines may not use training and may be speaker independent (e.g., as opposed to speaker dependent).

Speech recognition applications may include, for example, voice user interfaces such as voice dialing (e.g., "Call home"), call routing (e.g., "I would like to make a collect call"), appliance control, search (e.g., find a podcast where particular words were spoken), simple data entry (e.g., entering a credit card number), preparation of structured documents (e.g. a radiology report), speech-to-text processing (e.g., word processors or emails), and aircraft (e.g., direct voice input).

As an example, speech recognition may be performed using one or more application programming interfaces (APIs). As an example, consider the APPLE speech recognizer (https://developer.apple.com/documentation/speech). A portion of sample code appears below for the APPLE speech recognizer:

```
func recognizeFile(url:NSURL) {
    guard let myRecognizer = SFSpeechRecognizer( ) else {
        // A recognizer is not supported for the current locale
        return
    } if !recognizer.isAvailable( ) {
        // The recognizer is not available right now
        return
    } let request = SFSpeechURLRecognitionRequest(url: url)
    recognizer.recognitionTask(with: request) {(result, error) in
        guard let result = result else {
            // Recognition failed, so check error for details and handle it
            return
        }
    if result.isFinal {
        // Print the speech that has been recognized so far
        print("Speech in the file is
        \(result.bestTranscription.formattedString)")
    }
}}
```

In the foregoing example, a request is made and speech that has been recognized is returned from the speech recognizer (e.g., SR engine, etc.). Such text may be in the form of a text string, which may be a text file, etc.

As an example, a speech API may perform speech recognition by communicating with one or more remote resources (e.g., a remote server that includes SR functionality) and/or by utilizing on-device SR functionality (e.g., a local SR engine, etc.).

As an example, results of speech recognition may be utilized by an application to perform one or more operations.

Figure 3:
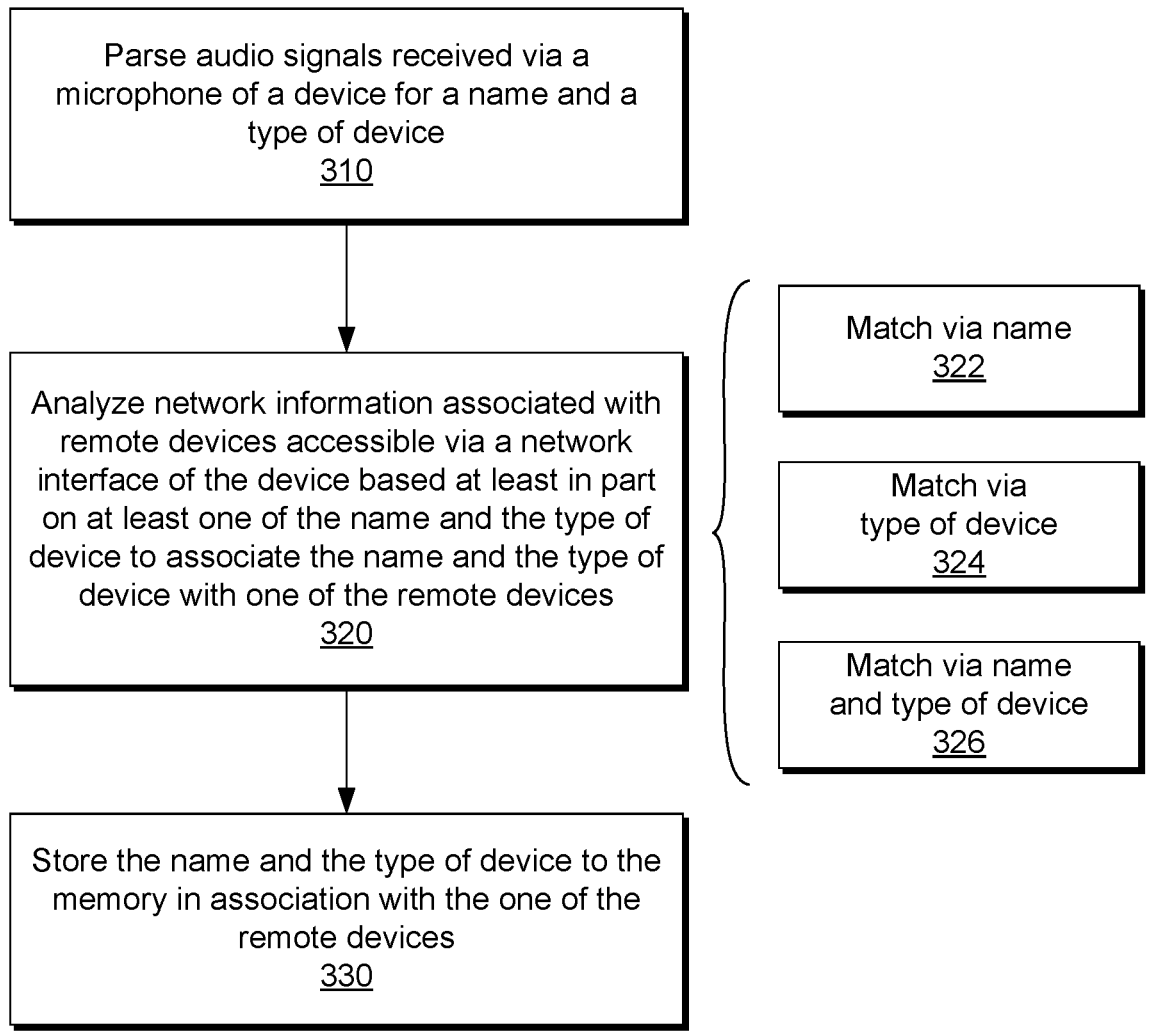
FIG. 3 is a diagram of an example of a method.

FIG. 3 shows an example of a method 300 that includes a parse block 310 for parsing audio signals received via a microphone of a device for a name and a type of device; an analysis block 320 for analyzing network information associated with remote devices accessible via a network interface of the device based at least in part on at least one of the name and the type of device to associate the name and the type of device with one of the remote devices; and a storage block 330 for storing the name and the type of device to the memory in association with the one of the remote devices.

As shown in the example of FIG. 3, the analysis block 320 may include an analysis that is match via name 322, an analysis that is match via type of device 324, and an analysis that is match via name and type of device 326.

Figure 4:
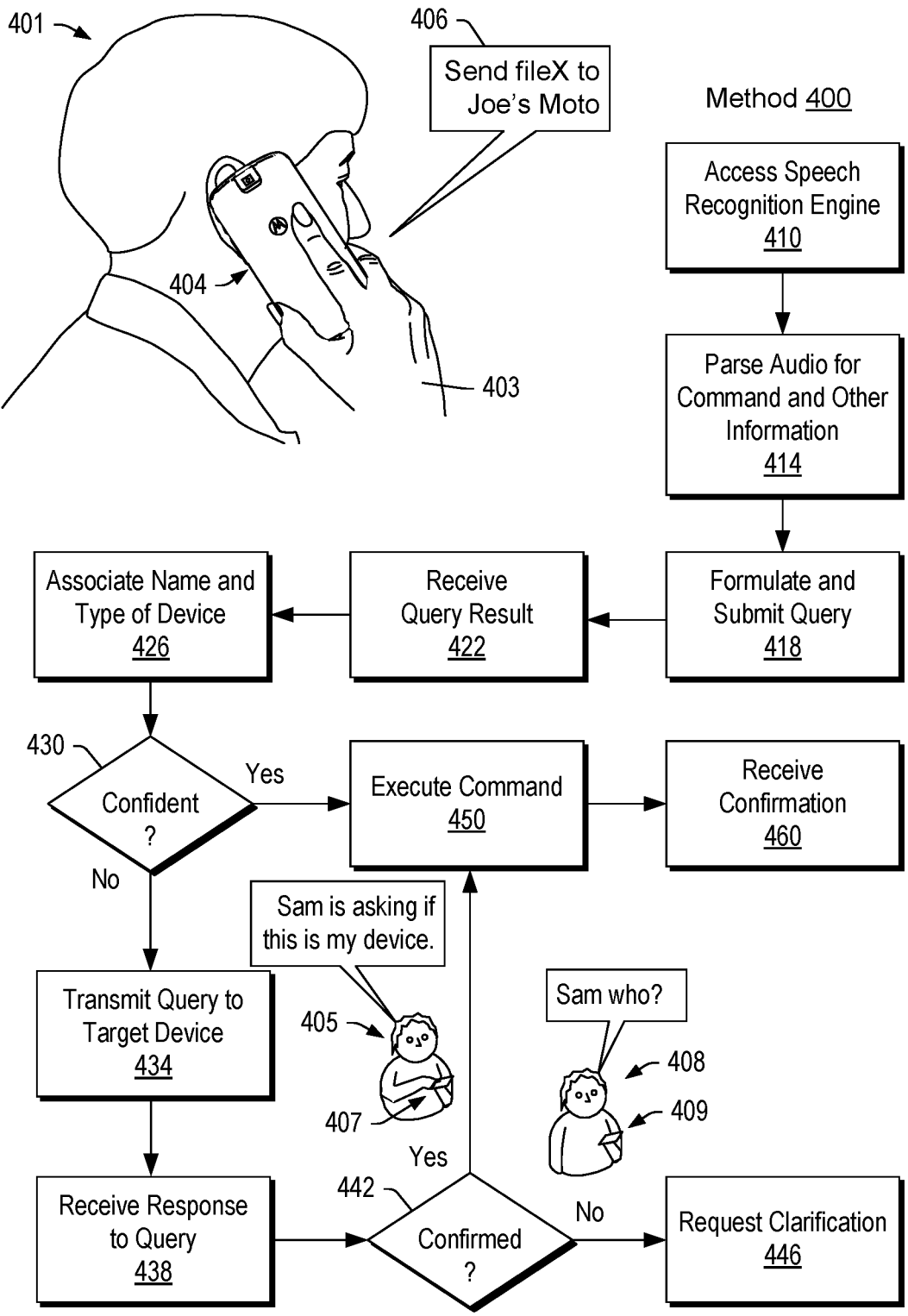
FIG. 4 is a diagram of an example of a method along with an example of an individual, an example of a device and an example of an utterance.

FIG. 4 shows an example of a method 400 along with an example of an individual 401 that has a hand 403 that is holding a device 404 where the individual 401 utters sound as audio 406 such as, for example, "Send file X to Joe's Moto", which includes information as to a verb and objects (e.g., file X, Joe, Moto, "Joe's Moto"). In such an example, the device 404 can be a smart phone, for example, consider the device 110 of FIG. 1, the device 210 of FIG. 2, etc. In the example of FIG. 4, such a device may be referred to as a hand-held device or hand-holdable device, which may correspond to an industry standard type of form factor. As an example, the device 404 may be referred to as a mobile device.

As an example, a mobile device can be a computing device that has dimensions that make it small enough to hold and operate in the hand (see, e.g., the hand 403 of the individual 401). A person's hand size may be measured by its length (e.g., hand sizes for males may range from approximately 15 cm to approximately 22 cm while hand sizes for females may overlap and may be of a lesser size).

FIG. 4 also shows individuals 405 and 408 along with devices 407 and 409. In such examples, the individual 401 may be Sam, the individual 405 may be Joe and the device 407 can be Joe's Moto device, and the individual 408 may be neither Sam nor Joe and the device 409 may be neither Sam's device 401 nor Joe's device 407. As an example, the devices 407 and 409 can be handheld (e.g., handholdable) or mobile devices such as, for example, smart phone devices. Such devices can include memory that can store information such as, for example, contact information. As an example, upon receipt of a query, a device may include circuitry that searches information such as contact information that may be stored in memory of the device that may be utilized to determine whether the query is to be confirmed, who initiated the query, what type of device initiated the query (e.g., Sam's IPHONE device), etc. As an example, a device can store information that can indicate that transmissions from a particular individual, device, etc. are to be accepted (e.g., a whitelist, etc.) or denied (e.g., a blacklist) or, for example, automatically responded to for purposes of further information, etc. As an example, where a query is received, a device may initiate a timer where if a user of the device does not respond within a period of time, the query is dismissed or, for example, responded to with a notification (e.g., no answer, timed out, etc.).

As an example, a mobile device can include a display (e.g., providing a touchscreen interface with digital buttons and keyboard), a microphone, a speaker, and circuitry that can connect to the Internet and interconnect with one or more other devices (e.g., a car entertainment system, a headset, etc.) where such a connection or connections may be via one or more types of technologies (e.g., consider wireless technologies such as Wi-Fi, BLUETOOTH, cellular network, near field communication (NFC), etc.). As an example, a mobile device can include one or more integrated cameras, a digital media player, circuitry to place and receive telephone calls (e.g., via one or more types of networks, etc.), and Global Positioning System (GPS) circuitry. As an example, a mobile device may be powered by a battery or batteries (e.g., one or more lithium-based batteries, etc.). As an example, a mobile device can include one or more processors and memory accessible to at least one of the one or more processors. As an example, a mobile device may include one or more sets of operating system instructions for one or more operating systems that can establish one or more corresponding operating system environments. As an example, an operating system may provide one or more application programming interfaces (APIs) that may allow an application, a service, etc., to make one or more types of calls to an operating system where, in turn, the operating system may respond to a call or calls with information.

As an example, GPS circuitry may be available through an API call that returns information such as latitude and longitude of the GPS circuitry (e.g., of a mobile device that includes or is operatively coupled to the GPS circuitry). In such an example, a device may utilize one or more types of location information as generated at least in part by GPS circuitry in combination with one or more other types of information (e.g., access point information, hotspot information, signal strength information, data rate information, contact information, etc.). In such an example, multiple types of information may be utilized to associate a name, a type of device, a name and a type of device, etc., with a particular remote device (see, e.g., the method 300 of FIG. 3, etc.).

In the example of FIG. 4, the method 400 includes an access block 410 for accessing a speech recognition engine to process audio received via a microphone of a device, a parse block 414 for parsing the received audio at least in part via the speech recognition engine (e.g., where the SR engine generates text, etc.) to generate parsed results that include a command and other information, a formulation and submission block 418 for formulating and submitting a query based at least in part on the parsed results (e.g., at least a portion of the other information, etc.), a reception block 422 for receiving a query result as a response to the formulated and submitted query, an association block 426 for associating a name and a type of device with respect to a remote device (e.g., identifiable via one or more networks, etc.) based at least in part on the received query result where the association block 426 may generate confidence information (e.g., probability of a correct association, etc.), a decision block 430 for deciding whether the association of the association block 426 is at a particular confidence level (e.g., via comparison to a confidence level threshold, etc.) based at least in part on the confidence information, and an execution block 450 that executes the command of the parse block 414 where the command is directed to the remote device with the associated name and type of device.

As shown in the example of FIG. 4, the method 400 may include a reception block 460 for receiving a confirmation that the command that was directed to the remote device was received and/or that action was taken per the command. For example, consider the audio 406 to be "Send file X to Joe's Moto" where the command is "Send file X to", where the name is "Joe" and where the type of device is a MOTOROLOA MOBILITY device such as a smart phone marketed under the trademark "MOTO". In such an example, the formulation and submission block 418 may formulate and submit a query that searches for "Joe" and "Moto" where, for example, "Joe" may be searched with respect to contact information (e.g., a contacts database) and/or network information and where "Moto" may be searched with respect to network information and/or contact information. As an example, where a device is operating as a hotspot with a name "JoeMoto", an association may be made as to the name "Joe", a type of device "Moto" and the identified hotspot device with the name "JoeMoto". In such an example, the method 400 can include storing information in memory as to the association of the name (e.g., "Joe", etc.), type of device (e.g., "Moto", etc.) and the identified remote device (e.g., "JoeMoto", etc.).

As an example, where a successful association is made, as may be determined by receipt of a confirmation per the reception block 460, a method may be performed that can bypass various blocks of the method 400. For example, such a method may include blocks 410 and 414 where a direct match may be made to the previously identified remote device (e.g., directly and/or indirectly) per information stored in memory. In such an example, where a MAC address of "JoeMoto" has been stored (e.g., as a type of device and/or network information), such information may be utilized to identify the targeted remote device optionally with or without "JoeMoto" (e.g., consider a scenario where a user may have changed a name of the device); or, for example, where a user may have changed that device (e.g., old device) for another device (e.g., new device), the MAC address may have changed though the user may have retained the name (e.g., "JoeMoto"), for example, via a restore, file transfer, settings transfer, etc. As explained, a method may be robust to changes that may occur as to one or more types of information such that confidence and rapidity of command execution as to a remote device may occur responsive to a user speaking into her device's microphone. In the example of FIG. 4, information such a "Joe's Moto" may be stored in association with one or more other pieces of information, which can include network information that can provide for identification of a remote device as being associated with "Joe's Moto" or not. In such an example, stored information may be utilized to narrow down possible remote devices as an intended target device through positively and/or negatively making decisions as to one or more identifiable devices as being operatively coupled to one or more networks.

Referring again to FIG. 4, where the decision block 430 decides that the association is not confident (e.g., with respect to a confidence level threshold, etc.), the method 400 may continue to a transmission block 434 that may transmit a query to a target device (e.g., the most likely remote device, etc.), which may cause rendering of a GUI, a text message, etc., to which the target device may respond. As shown, the method 400 can include a reception block 438 for receiving a response to a query transmitted to the target device of the transmission block 434 and can include a decision block 442 for deciding whether the target device is confirmed to be "Joe's Moto" in the example of FIG. 4. Where the decision block 442 decides that the target device is the intended remote device, the method 400 may process to the execution block 450 and where the decision block 442 decides that the target device is not the intended remote device, the method 400 may proceed to a request block 446 that can issue a clarification request, for example, as a GUI, a prompt, etc., of the device 404 of the individual 401. In such an example, the individual 401 may utter further audio that can be processed via one or more blocks of the method 400. For example, the individual 401 may utter "Joe Smith's Moto" such that the information "Smith" may be utilized.

As an example, a method can include analyzing available network information as to remote devices, for example, to match based on a name (e.g., "Joe", which may be unique for given network information), a device (e.g., "Moto", which may be unique for given network information), and/or name and device (e.g., "Joe" and "Moto", which may be of a higher probability of being unique for given network information compared to name alone or device alone).

As an example, where audio information includes "Joe's Moto", if there is a hit on "Joe" alone, then a method may assume that hit is sufficient to associate "name and type of device" with one of the remote devices (e.g., at least for purposes of a query to the remote device); if there is a hit on "Moto" alone, then a method may assume that hit is sufficient to associate "name and type of device" with one of the remote devices (e.g., at least for purposes of a query to the remote device); and if there are hits on both "Joe" and "Moto" (e.g., or "Joe's Moto"), a method may assume that the hits are sufficient to associate "name and type of device" with one of the remote devices; noting that a query may be sent for purposes of confirmation, etc.

As an example, where a method includes storing an association or associations to memory, in the context of the example of FIG. 4, such a method may store "Joe's Moto" for the remote device (e.g., stored in memory as a temporary association, as a final, definitive result, etc.). In such an example, when it comes to the command "send to Joe's Moto", a method may include probing with a query to the remote device such as, for example, "hey Joe, is this your Moto?" or "is this Joe's Moto?". As an example, a method can include formulating a message for a probing query that is transmitted to a remote device. In such an example, the formulated message can include information from audio as digitized and/or parsed from an utterance of an individual (e.g., the audio 406 of the individual 401).

As an example, the individual 401 may utter a direction such as "Send file X to Joe's Moto, east of me". In such an example, information from GPS, a compass, one or more networks, etc., may be utilized to include and/or exclude one or more networks and/or one or more devices. For example, consider the device 404 as including GPS circuitry such that a location (e.g., latitude and longitude) can be determined for the device 404 and where network signals may be analyzed to determine directionality with respect to the location. As an example, the individual 401 may move the device 404 such as rotationally to direct it in various directions (e.g., E, W, N, S, etc.) where signal strength and/or one or more other metrics may be associated with direction. In turn, the device 404 may determine that one or more network signals are "east of me" such that those signals may be considered as being a subset of signals possibly associated with Joe's Moto. As an example, the individual 401 may be in an office in a building where "Joe" is likely in another office or location in the building, on campus, etc., that is within a common network (e.g., a corporate network for the location). In such an example, the individual 401 may know that "Joe" is likely to be in that office or location and to know a direction of the office or location given his current location (e.g., location of the device 404).

As to analysis of audio information that may be received by a microphone and digitized, a device may utilize one or more types of circuitry, which can include, for example, local circuitry and/or remote circuitry. Circuitry can include functionality as to speech recognition (SR) and/or functionality as to natural language processing (NLP). As an example, a SR engine can process digital audio information to generate output that may be in the form of individual words. As an example, a NLP engine may receive individual words as may be output from a SR engine. In such an example, the NLP engine may process the individual words in relationship to one or more factors. For example, an NLP engine may process individual words in an order or orders with respect to one or more grammars. As an example, a grammar may define nouns, verbs, etc., and, for example, associations therebetween.

As an example, a method can include analyzing audio information as to a particular sentence type or types. For example, consider an imperative sentence type or an interrogative sentence type. Such a method may analyze audio information as to an uttered imperative sentence "Send to Joe's Moto" where the verb "send" (e.g., "send to") may be analyzed to be a command and where "Joe's Moto" may be analyzed to be a possessive as to two nouns where a relationship of belonging exists between the two nouns (e.g., one thing and another thing). In such an example, one of the nouns may be analyzed to be a person and the other one of the nouns may be analyzed to be a thing (e.g., an object such as a smart phone). As an example, a possessive form of nouns as present in audio information may be analyzed with respect to one or more other types of information to make an association between one or more of the nouns in the possessive form and a device that is identifiable via one or more networks (e.g., a WiFi network, a BLUETOOTH network, etc.). In such an example, the one or more other types of information may be, for example, contact information as stored in a contacts database (e.g., memory) of a device (e.g., locally) and/or as stored in a contacts database (e.g., memory) of a remote piece of equipment (e.g., cloud storage, etc.).

As an example, a SR engine and/or a NLP engine may be specifically constructed to analyze audio information for a possessive form. For example, a SR engine and/or a NLP engine may be trained based on a sound or sounds associated with an apostrophe "s" as utilized in a possessive form of speech. As an example, a user may be prompted to say each of a series of names (e.g., a set of common names) as the name itself and then the possessive form of the name (e.g., John and then John's). In such an example, the SR engine and/or NLP engine may be specifically tailored to recognition and/or identification of a possessive form of a name where the name may be determined from the possessive form. In such an example, a name determined from a possessive form may be utilized in a query that aims to match the name with name information as may be in a contacts list, network information (e.g., devices that may include a name or a portion of a name of a person, etc.), etc.

As an example, a method, a SR engine, a NLP engine, etc., may allow for identification of a genitive morpheme (e.g., as in possessive forms). For example, consider one or more of the following examples of the genitive morpheme:
Ex. A. Written as "'s" and pronounced as /s/: cat's, Elizabeth's, Joseph's, Mike's
Ex. B. Written as "'s" and pronounced as /z/: Barbara's, dog's, John's, Mary's
Ex. C. Written as "'s" and pronounced as /ɪz/: Boris's, Marge's, Rose's, virus's
Ex. D. Written as "'" and not pronounced (plurals): cats', dogs'
Ex. E. Written as "'" and not pronounced (classical and biblical names): Augustus', Jesus', Moses'

As mentioned, a method may include analyzing an imperative sentence or an interrogative sentence. As to an interrogative sentence, consider as an example: "Where's Joe's Moto?". In such an example, a SR engine and/or a NLP engine may process audio information to return a result such as "Joe's Moto is online" or, for example, "Joe's Moto is offline" or, for example, "Joe's Moto not found". As to an interrogative sentence, a command may be inherent such as, for example, "where's" meaning "return a status" and/or "return a location".

As explained above, a method may be operable as to various types of sentences, which may include imperative sentences and interrogative sentences. In either instance, a sentence can include information in a possessive form that links two nouns. As an example, a method can include utilizing one or both nouns in a possessive form of a sentence as in audio information to make an association between at least one of the nouns and a device that is network enabled and identifiable on at least one network.

As an example, a device may include circuitry that can implement a relatively light-weight speech recognition engine and/or NLP engine. Such circuitry may be trained by a user via utterance of names in a contacts database (e.g., contact information) stored locally in memory of the device and, for example, via utterance of types of devices, which may be provided in a types of devices database (e.g., device information) stored locally in memory of the device. As the number of names may be of the order of one thousand (e.g., consider average number of connections for a LINKEDIN system user) and as the number of types of devices may be of the order of one hundred, memory utilization may be manageable for a mobile device (e.g., a smart phone) in terms of recognition of short words such as names and types of devices as well as possessive forms that can be combinations thereof. As an example, a command database for types of commands and an objects database for types of objects that can be acted upon via a command or commands may be a finite predetermined set, as may be available, for example, by an application (e.g., an app) that executes at least in part locally on a device (e.g., a smart phone app, etc.).

As an example, an application that can execute at least in part locally on a device (e.g., a smart phone device, etc.) may include features that allow a user to build a database or databases of names and types of devices. In such an example, the database may associate a name and/or one or more types of devices with other information, which can include information that may be identifiable via a network connection, etc. As an example, a device may include circuitry that can generate and/or store information as to "things", for example, in an Internet of Things (IoT) context. In such an example, a user may have entries for her "things", which may be proceeded in speech by the work "my" or by the user's name (e.g., "Ellen's XBOX", etc.). In such an example, such a device may include local circuitry for instantiating a speech recognition engine and/or a NLP engine that can receive audio information and perform one or more actions responsive to receipt of such audio information. As an example, a device can include circuitry that can understand possessives as in the possessive form where, for example, there is an owner of a thing.

As an example, a device can include circuitry that can recognize possessive sounds where, in the English language, such sounds can include, for example, /s/ (e.g., as in cat's, Elizabeth's, Joseph's, Mike's, etc.), /z/ (e.g., as in Barbara's, dog's, John's, Mary's, etc.), and /ɪz/ (e.g., Boris's, Marge's, Rose's, virus's, etc.). Such a device can include circuitry that links a word that is directly after in time (e.g., as in audio information) from a word that has a possessive sound. Such a linkage can form a query or at least a portion of a query that can be utilized in an effort to identify a device that is operatively coupled to a network (e.g., Joe's Moto, etc.).

As an example, a device can include an individualized user mode for a plurality of device (e.g., things, etc.) of the user and an "other" mode for a plurality of devices of one or more others. In such an example, the individualized user mode can include circuitry that can recognize the English word "my" as occurring before a noun such that "my" expresses possession of the noun. While some English language examples are given, circuitry may operate in one or more other languages as to possessives, etc.

Figure 5:
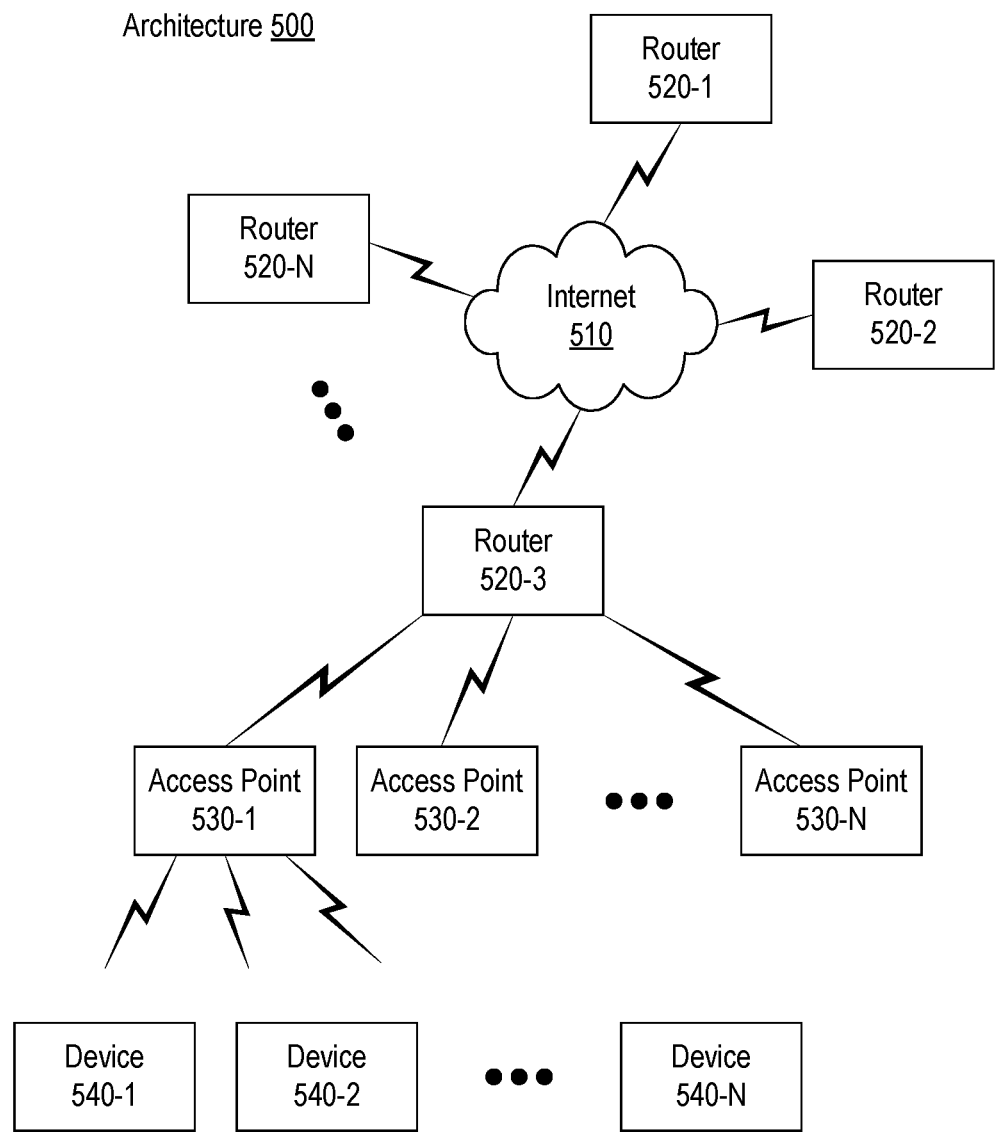
FIG. 5 is a diagram of an example of an architecture.

FIG. 5 shows an example of an architecture 500 that includes the Internet 510, a plurality of routers 520-1 to 520-N, a plurality of access points 530-1 to 530-N and a plurality of devices 540-1 to 540-N. In the example of FIG. 5, a device may be configured to operatively couple to one or more access points, one or more routers, etc. As an example, the architecture 500 may be for a facility such as a building, a campus, etc. As an example, the architecture 500 may be for a plurality of sites (e.g., buildings, etc.). With respect to the example of FIG. 4, the device 404 may be operatively coupled to one or more pieces of equipment in the architecture 500 (e.g., shown or not shown) and "Joe's Moto", as a device, may be operatively coupled to one or more pieces of equipment in the architecture 500 (e.g., shown or not shown). In such an example, one or more access points (e.g., one or more hotspots or other types of APs) may be identified where the device 404 and/or the device "Joe's Moto" may join such that they are on a common network (e.g., or coupled networks, etc.) where devices can be identified for purposes of transmission of information (e.g., command(s), data, etc.).

As an example, in an architecture, each piece of equipment, each device, etc., can have an associated identifier or identifiers. For example, an identifier may be assigned by a manufacturer, assigned by a user, etc.

FIG. 6 shows an example of information 600 in tabular form, which may, for example, be stored in memory of a piece of equipment, a device, etc. As an example, information may be discoverable. In the example of FIG. 6, such information can be or include WiFi technology information. As an example, circuitry such as circuitry of a packet analyzer may discover information.

A packet analyzer (also known as a network analyzer, protocol analyzer or packet sniffer or, for particular types of networks, an Ethernet sniffer or wireless sniffer) is a piece of equipment (e.g., dedicated, computer, device, etc.) that can intercept and log traffic that passes over a digital network or part of a network. As data streams flow across the network, a sniffer can capture a packet and, if desired, decode the packet's raw data, showing the values of various fields in the packet, and can analyze its content according to an appropriate RFC or other specifications. A process of packet capture can involve intercepting and logging network traffic.

As an example, a program such as the inSSIDer program can be executable to log RSSI, Security, Channel, Hardware Vendor, Max Rate, Network Type and MAC address in columns of a table. As an example, such an identifier program may be executable on a device such as the device 110 of FIG. 1, the device 210 of FIG. 2, the device 404 of FIG. 4, etc.

As an example, information acquired via an identifier program may include MAC Address (a unique identifier for a wireless network where, in an infrastructure network, it can be a radio's MAC Address and where, in an ad-hoc environment, it can be a pseudo-randomly generated MAC Address), SSID (Service Set Identifier, which is the name an 802.11 wireless network uses to identify itself), RSSI (Received Signal Strength Indication, which is the amplitude level of the wireless network as seen by a wireless card/adapter/interface), Channel (e.g., channels 1-14 in the 2.4 GHz frequency range, channels 30-160 in the 5 GHz range, etc.), Channel Bonding (two numbers in the channel column, which indicates that a network is using "channel bonding"), Vendor (hardware vendor of an Access Point, if available), Max Rate (maximum rate, or data throughput that each Access Point is capable of operating), Security (e.g., security settings: Open, WEP, WPA Personal, WPA-Enterprise, WPA2-Personal, WPA2-Enterprise, Wi-Fi Protected Setup, or Open (No Security)), Network Type (e.g., infrastructure networks are access points which facilitate communication between clients, ad-hoc or independent networks are clients operating in a wireless network without an access point), etc.

As an example, a device may be configured to operate using a GPS unit that can track location, for example, as a device moves, optionally while tracking information (e.g., access points, etc.). As an example, GPS information may be stored in the form of latitude and longitude. Such information may be utilized along with other information to determine proximity of one or more access points (e.g., stronger signal amplitude, etc.).

Referring again to the information 600, the table includes a device list column that includes interface information (e.g., vlan, br, eth, etc.), a MAC address column, an IP address column, a name column, an RSSI column, a quality column, a TX/RX rate column, and a lease column.

As shown in the name column, names may be "Moto", "iPhoneSMP", "SMP-PC", "Susan-TP", "Dad", "HP4EXXYY", etc. As indicated, a name can include information as to a person's name (e.g., Susan, SMP, etc.), a manufacturer identifier (e.g., Moto, iPhone, HP, etc.), a person's familial role (e.g., Dad), a trademark of a device (e.g., Moto, iPhone, etc.), a type of device (e.g., PC, Phone, etc.).

As an example, a method can include accessing information in real-time and comparing parsed information from audio input (e.g., digitized audio data) to at least a portion of the real-time information to seek a match (e.g., a best match, closest match, ranking of match probabilities, etc.). For example, where the audio input includes "Dad", a match may be made with the name "Dad" in the device list. As mentioned, a network may be ad-hoc or of another type. As an example, a smart phone may be operable as a "hotspot" that is an access point, which may be referred to as a mobile hotspot. Being mobile, the hotspot may show information that may vary with respect to time where the hotspot moves (e.g., a person is carrying a mobile hotspot and moving, etc.).

As an example, a mobile hotspot can be an ad hoc wireless access point that is created by a dedicated hardware device or a smart phone feature that shares the phone's cellular data. Mobile hotspots may also be known as portable hotspots. The hardware devices used to create them (e.g., pocket or travel routers), may be referred to as mobile hotspots. Pocket routers may access cellular signals and convert 3G, 4G, etc., signals to Wi-Fi and vice versa, creating mobile Wi-Fi networks that can be shared by multiple devices (e.g., within about 10 meters of a pocket router device). Various smart phones can enable creation of a mobile hotspot through tethering, accessing the phone's existing cellular data connection.

As an example, information for a mobile hotspot created by a device may include a name that is, for example, an assigned name to the device by a user of the device. As an example, in a work environment, work phones (e.g., smart phones) may be assigned names that conform to a particular format such as, for example, an employee ID, etc. For example, consider a numeric, an alphabetic or an alpha numeric employee ID. In such an example, where a person knows of such a naming convention and knows another's employee ID or approximately what that employee ID may be, the person may utter that information audibly in an effort to match a command with a device assigned that employee ID.

FIG. 7 shows an example of information 700 as illustrated in tabular form. Such information can be BLUETOOTH technology information. In the example of FIG. 7, the information 700 includes MAC address, Vendor, Signal Strength, Signal Strength History (e.g., signal strength with respect to time), Class (e.g., Cell Phone, Laptop, Portable Audio), and Services (e.g., Networking Object Transfer, Telephony; Networking Capturing Object Transfer, Telephone; Networking Capturing Audio, Telephony; Networking Capturing Object Transfer, Audio; etc.).

In the example of FIG. 7, the information includes Vendor information such as "Nokia", "Apple", etc. As an example, a device may include stored information that can associate a vendor with one or more products. For example, consider an association between "Apple" and "iPhone" as a type of smart phone. Such information may be utilized in performing a search (e.g., formulating a query, etc., as in the method 400 of FIG. 4, etc.).

FIG. 8 shows an example of information 800 as illustrated in tabular form. Such information includes information that may be accessed by an identifier program (see, e.g., the inSSIDer program). As shown, the information 800 includes Radio, SSIDS, Channel, Signal (strength), SSID Count, PHY Type (e.g., b, g, n, etc.), Security (e.g., Locked, Unlocked, etc.), Minimum Rate and Maximum Rate.

In the example of FIG. 8, the SSIDS information includes vendor information such as "NETGEAR", carrier information such as "CenturyLink" and "Charter", address information such as "1105Adams", etc. Where a device such as a cellular network device is operating as a hotspot (e.g., a mobile hotspot), it may appear as information such as "iPhoneSMP", which may possibly be associated with the SSIDS "SMP-WiFi". As an example, a mobile hotspot may be identified via one or more types of information, which may include information with respect to time. For example, if a person is using a smart phone as a mobile hotspot, if the person moves with the smart phone to another location (e.g., via car, etc.), that information disappear from a listing of devices as discoverable via an identifier program. In such an example, the device may be associated with an indicator that indicates that the device is or likely is a mobile device that can operate as a mobile hotspot. As an example, a hotspot such as a mobile hotspot may be identified via information such as rate information. For example, a cellular network (e.g., 3G, 4G, etc.) as a hotspot may operate at a lesser rate than a wired accessed point such as a DSL or cable access point. As an example, consider a mobile hotspot with a maximum data rate less than approximately 100; whereas, comparatively, a wired access point may have a maximum data rate greater than approximately 100 (e.g., greater than approximately 200, etc.).

FIG. 9 shows an example of types of information 900 that may be available in a contacts application of a device such as, for example, a smart phone. As shown in FIG. 9, the information 900 can include address, display name, type (e.g., home, mobile, other, work, etc.).

FIG. 10 shows an example of types of information 1000 that may be available in a contacts application of a device such as, for example, a smart phone. As shown, the information 1000 can include a raw contact ID, a display name, a phone number, a number of times contacted, a last time contacted, etc. As an example, a method may include accessing one or more types of information that may include one or more of the types of information 1000 in an effort to associate parsed audio with a remote device, for example, for purposes of storage, execution of a command, etc.

Figure 11:
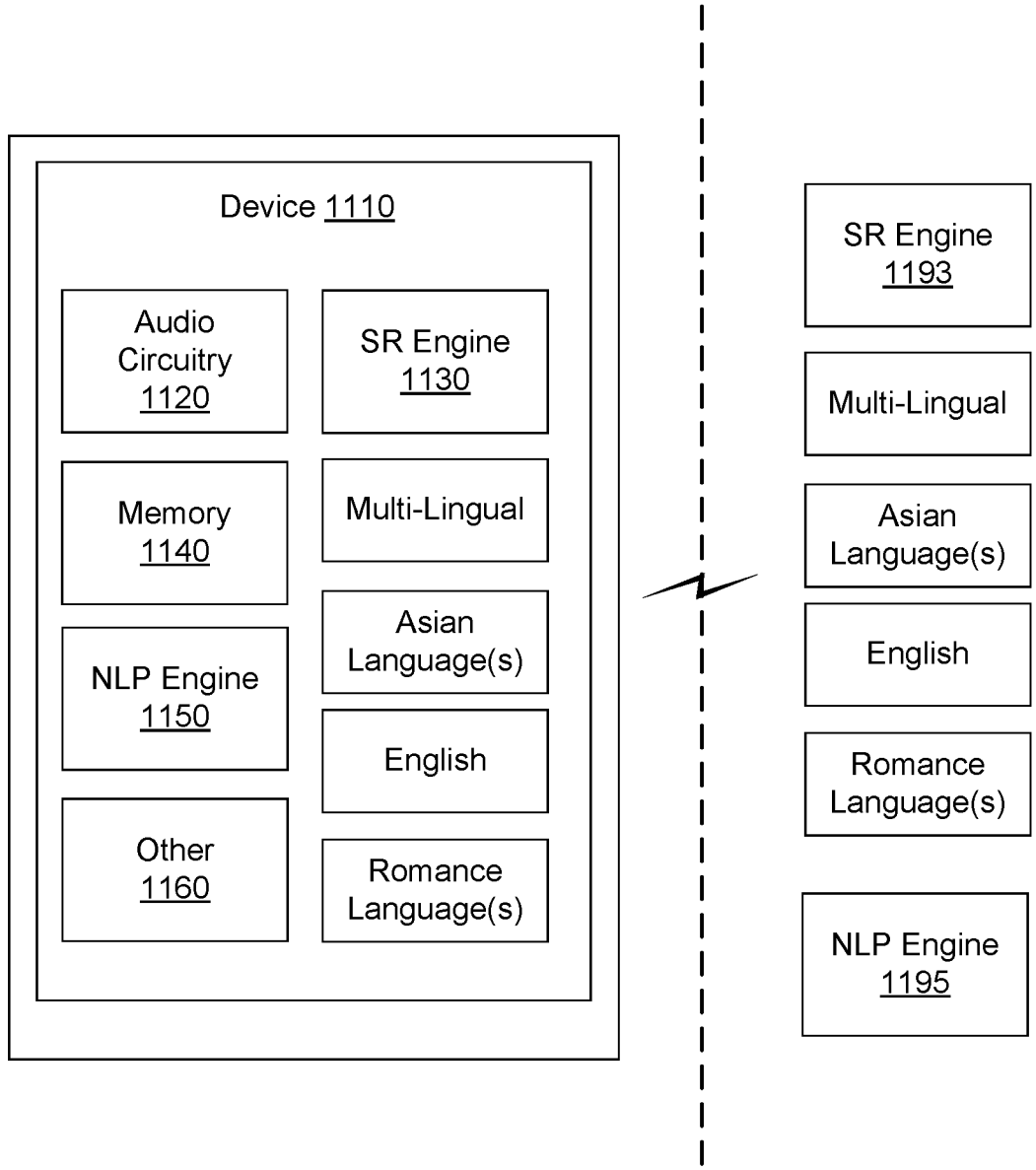
FIG. 11 is a diagram of an example of a device and an example of a speech recognition engine.

FIG. 11 shows an example of a device 1110 that includes audio circuitry 1120, an SR engine 1130, memory 1140, a natural language processing (NLP) engine 1150 and one or more types of other circuitry 1160. In such an example, the SR engine 1130 and/or the NLP engine 1150 may be configured for multi-lingual input, one or more Asian languages, English, one or more Romance languages, etc. As an example, an external SR engine 1193 and/or an external NLP engine 1195 may provide for one or more features and may be accessible by the device 1110, for example, via one or more network interfaces of the device 1110. As shown, the device 1110 includes memory, which may be utilized for storage of associations where such associations may be based on the device 1110 performing a method such as the method 300 of FIG. 3, the method 400 of FIG. 4, etc.

As an example, a device can include a processor; memory accessible to the processor; a microphone operatively coupled to the processor; a network interface operatively coupled to the processor; circuitry that parses audio signals received via the microphone for a name and a type of device; circuitry that analyzes network information associated with remote devices accessible via the network interface based at least in part on at least one of the name and the type of device to associate the name and the type of device with one of the remote devices; and circuitry that stores the name and the type of device to the memory in association with the one of the remote devices. In such an example, the network information can include wireless network information.

As an example, a device can include circuitry that parses audio signals for a possessive form that includes a name and a type of device. For example, consider a form such as "XXXX's YYYY" where XXXX is a name and where YYYY is a type of device and where "'s" is at least in part an indicator of a possessive form.

As an example, circuitry that parses can include circuitry that parses audio signals for a command. In such an example, a device can include circuitry that issues the command via a network interface to one of a plurality of remote devices.

As an example, a device can include circuitry that issues a notification via a network interface to one of a plurality of remote devices. In such an example, the notification may include a query to confirm or deny whether a name is properly associated with the one of the remote devices. As an example, a notification can include a query to confirm or deny whether a type of device is properly associated with one of a plurality of remote devices. As an example, a notification can include a query to confirm or deny whether a name and a type of device are properly associated with one of a plurality of remote devices.

As an example, network information can include identifiers broadcast by one or more remote devices. As an example, network information can include historical information for communication of information via the network interface. As an example, network information can include email information. As an example, network information can include text message information. As an example, network information can include cellular information. As an example, network information can include signal strength information.

As an example, circuitry that analyzes network information can include circuitry that analyzes contact information that includes names. As an example, a method may include associating a name with a possessive form of a name.

As an example, a network interface can be or can include a BLUETOOTH interface. As an example, a network interface can be or can include a WiFi interface. As an example, a device can include a network interface that is an interface specified by IEEE (e.g., 802.11, etc.).

As an example, a type of device can be a member selected from a group that includes a handheld device, a wearable device and a desktop device.

As an example, a type of device, in terms of information, can be a trademark. For example, consider a device that is marketed utilizing such a trademark (e.g., IPHONE device, MOTO device, SAMSUNG device, ANDROID device, IOS device, WINDOWS device, INTEL device, AMD device, etc.).

As an example, a device can include information as to types of devices stored in memory of the device. In such an example, the device can include circuitry that matches a type of device with one of the types of devices stored in the memory. In such an example, one or more of the types of devices stored in the memory may include multiple identifiers (e.g., IOS device, IPHONE device and handheld device, etc.). As an example, one of a plurality of types of devices stored in memory may include a form factor identifier and a trademark identifier. As to a form factor identifier, consider "pad", "notebook", "netbook", "PC", "phone", etc.

As an example, a device can include names stored in memory. In such an example, names may be names as in a contacts database or a portion thereof such as a first name, a last name, a middle name, a nickname, a familial name, etc. In such an example, the device can include circuitry that matches a name with one of a plurality of the names stored in the memory. As an example, names can include at least one of a first name and a last name. As an example, names can include relationship terms (e.g., spouse, husband, wife, partner, dad, mom, child, etc.). As an example, names can include titles (e.g., Dr., Prof., Director, etc.).

As an example, a method can include parsing audio signals received via a microphone of a device for a name and a type of device; analyzing network information associated with remote devices accessible via a network interface of the device based at least in part on at least one of the name and the type of device to associate the name and the type of device with one of the remote devices; and storing the name and the type of device to the memory in association with the one of the remote devices. In such an example, parsing can include parsing audio signals for a command. In such an example, the method can include issuing the command via the network interface to the one of the remote devices. As an example, a method can include issuing a notification via a network interface to one of a plurality of remote devices. As an example, a method can include analyzing network information in a manner that analyzes contact information that includes names. As an example, a method implemented by a device (e.g., a local device) can include matching a type of device as to a remote device with a type of device stored in memory of the device (e.g., the local device). As an example, a method implemented by a device (e.g., a local device) can include matching a name with a name stored in memory of the device (e.g., the local device) where the name can be associated with a device identifiable via a network (e.g., a remote device operatively coupled to a network).

As an example, one or more computer-readable storage media can include processor-executable instructions to instruct a device to: parse audio signals received via a microphone of a device for a name and a type of device; analyze network information associated with remote devices accessible via a network interface of the device based at least in part on at least one of the name and the type of device to associate the name and the type of device with one of the remote devices; and store the name and the type of device to the memory in association with the one of the remote devices.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that include at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 12:
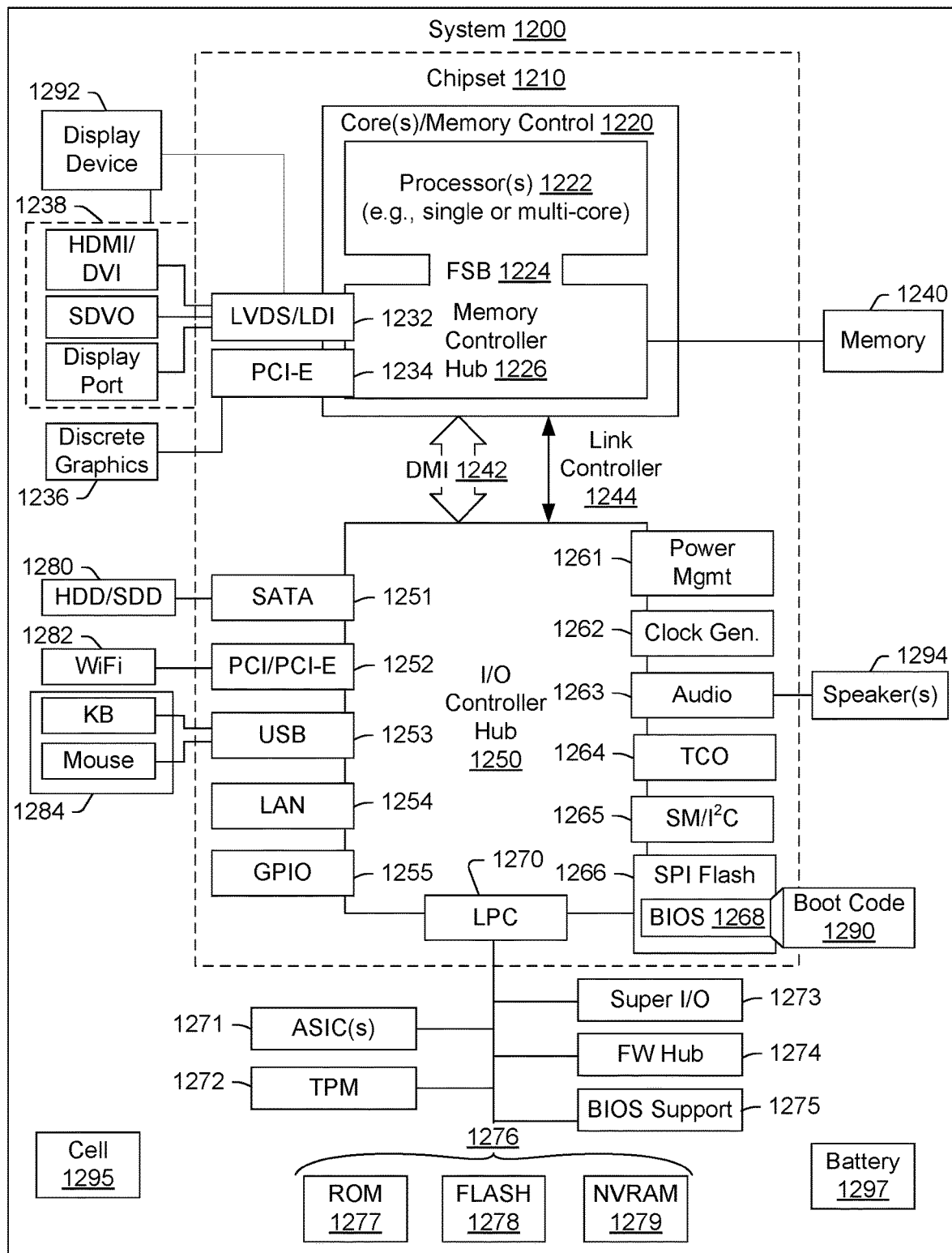
FIG. 12 is a diagram of an example of a system that includes one or more processors.

While various examples of circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1200. As an example, the device 110 of FIG. 1, the device 210 of FIG. 2, the device 404 of FIG. 4, the device 1110 of FIG. 11, etc. can include one or more features of the system 1200 of FIG. 12.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A mobile device comprising:
   a processor;
   memory accessible to the processor;
   a microphone operatively coupled to the processor;
   a network interface operatively coupled to the processor;
   circuitry that, responsive to device user input, selects content;
   circuitry that parses device user voice utterance audio signals received via the microphone for a name and a type of device, wherein the device user voice utterance comprises a command to transmit the selected content;
   circuitry that analyzes network information associated with remote mobile devices accessible via the network interface based at least in part on at Last one of the name and the type of device to associate the name and the type of device with one of the remote mobile devices, wherein the network information is accessible via memory of network equipment and comprises an address and a text string for the one of the remote mobile devices, wherein the text string is broadcast by the one of the remote mobile devices, identifies the one of the remote mobile devices and differs from a text string formed by concatenation of the name and the type of device, and wherein the network information comprises historical information for network connection to the network equipment for the one of the remote mobile devices;

circuitry that issues a notification via the network interface to the one of the remote mobile devices, wherein the notification comprises a remote device user query to confirm or deny whether at least one of the name and the type of device is properly associated with the one of the remote mobile devices, wherein the device user and the remote device user differ;

circuitry that, responsive to receipt of a response to the remote device user query that confirms that at least one of the name and the type of device is properly associated with the one of the remote mobile devices to form a proper association, stores the proper association to memory, wherein the stored proper association comprises the name and the type of device and an identifier for the one of the remote mobile devices; and circuitry that, responsive to the receipt of the response to the remote device user query that confirms, executes the command to transmit the selected content to the one of the remote mobile devices.

2. The mobile device of claim 1, wherein the network information comprises wireless network information.

3. The mobile device of claim 1, wherein the circuitry that parses comprises circuitry that parses audio signals for a possessive form that comprises the name and the type of device.

4. The mobile device of claim 1, wherein the notification comprises a remote device user query to confirm or deny whether the name is properly associated with the one of the remote mobile devices.

5. The mobile device of claim 1, wherein the notification comprises a remote device user query to confirm or deny whether the type of device is properly associated with the one of the remote mobile devices.

6. The mobile device of claim 1, wherein the notification comprises a remote device user query to confirm or deny whether the name and the type of device are properly associated with the one of the remote mobile devices.

7. The mobile device of claim 1, wherein the network interface comprises an interface specified by IEEE.

8. The mobile device of claim 1, wherein the type of device comprises a member selected from a group consisting of a handheld device and a wearable device.

9. The mobile device of claim 1, wherein the type of device comprises a trademark.

10. The mobile device of claim 1, wherein the circuitry that analyzes the network information utilizes at least a portion of the historical information for confirmation of the association of the name and the type of device with the one of the remote mobile devices, wherein the historical information comprises at least one time dependent data value.

11. The mobile device of claim 1, wherein the notification comprises an instruction to render the query to a display of the one of the remote mobile devices.

12. The mobile device of claim 11, wherein the instruction calls for rendering the query to the display as a text message.

13. A method performed by a mobile device, the method comprising:

selecting content responsive to device user input of the mobile device:

parsing device user voice utterance audio signals received via a microphone of the mobile device for a name and a type of device, wherein the device user voice utterance comprises a command to transmit the selected content;

analyzing network information associated with remote mobile devices accessible via a network interface of the mobile device based at least in part on at least one of the name and the type of device to associate the name and the type of device with one of the remote mobile devices, wherein the network information is accessible via memory of network equipment and comprises an address and a text string for the one of the remote mobile devices, wherein the text string is broadcast by the one of the remote mobile devices, identifies the one of the remote mobile devices and differs from a text string formed by concatenation of the name and the type of device, and wherein the network information comprises historical information for network connection to the network equipment for the one of the remote mobile devices;

issuing a notification via the network interface to the one of the remote mobile devices, wherein the notification comprises a remote device user query to confirm or deny whether at Last one of the name and the type of device is properly associated with the one of the remote mobile devices, wherein the device user and the remote device user differ;

responsive to receipt of a response to the remote device user query that confirms that at least one of the name and the type of device is properly associated with the one of the remote mobile devices to form a proper association, storing the proper association to memory, wherein the stored proper association comprises the name and the type of device and an identifier for the one of the remote mobile devices; and responsive to the receipt of the response to the remote device user query that confirms, executing the command to transmit the selected content to the one of the remote mobile devices.

14. One or more computer-readable storage media that comprises processor-executable instructions to instruct a mobile device to:

select content responsive to device user input of the mobile device;

parse device user voice utterance audio signals received via a microphone of the mobile device for a name and a type of device, wherein the device user voice utterance comprises a command to transmit the selected content;

analyze network information associated with remote mobile devices accessible via a network interface of the mobile device based at least in part on at least one of the name and the type of device to associate the name and the type of device with one of the remote mobile devices, wherein the network information is accessible via memory of network equipment and comprises an address and a text string for the one of the remote mobile devices, wherein the text string is broadcast by the one of the remote mobile devices, identifies the one of the remote mobile devices and differs from a text string formed by concatenation of the name and the type of device, and wherein the network information comprises historical information for network connection to the network equipment for the one of the remote mobile devices;

issue a notification via the network interface to the one of the remote mobile devices, wherein the notification comprises a remote device user query to confirm or deny whether at least one of the name and the type of device is properly associated with the one of the remote mobile devices, wherein the device user and the remote device user differ;

responsive to receipt of a response to the remote device user query that confirms that at least one of the name and the type of device is properly associated with the one of the remote mobile devices to form a proper association, store the proper association to memory, wherein the stored proper association comprises the name and the type of device and an identifier for the one of the remote mobile devices; and responsive to the receipt of the response to the remote device user query that confirms, execute the command to transmit the selected content to the one of the remote mobile devices.

* * * * *